(12) United States Patent
Brooker et al.

(10) Patent No.: US 10,824,339 B1
(45) Date of Patent: Nov. 3, 2020

(54) SNAPSHOT-BASED GARBAGE COLLECTION IN AN ON-DEMAND CODE EXECUTION SYSTEM

(71) Applicant: Amazon Technologies, Inc., Seattle, WA (US)

(72) Inventors: Marc John Brooker, Seattle, WA (US); Andrew J. Lusk, Seattle, WA (US); Mikhail Danilov, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/452,425

(22) Filed: Jun. 25, 2019

(51) Int. Cl.
  *G06F 9/46* (2006.01)
  *G06F 3/06* (2006.01)
  *G06F 9/50* (2006.01)

(52) U.S. Cl.
  CPC .......... *G06F 3/0608* (2013.01); *G06F 3/0652* (2013.01); *G06F 3/0664* (2013.01); *G06F 3/0673* (2013.01); *G06F 9/5077* (2013.01)

(58) Field of Classification Search
  None
  See application file for complete search history.

*Primary Examiner* — Gregory A Kessler
(74) *Attorney, Agent, or Firm* — Knobbe Martens Olson & Bear LLP

(57) ABSTRACT

Systems and methods are described for management of garbage collection processes in an on-demand code execution system. An on-demand code execution system may execute user-submitted code on virtual machine instances, which may be hosted on various host computing devices. As each virtual machine instance executes code, garbage (e.g., memory that is allocated and then not properly de-allocated) may accumulate and may reduce the computing resources that the instance makes available for allocation to further code executions. A garbage collection manager may be implemented on each host computing device that implements garbage collection by taking a snapshot of the virtual machine instance prior to the accumulation of garbage, and then restoring the snapshot rather than identifying and de-allocating garbage on an item-by-item basis. The virtual machine instance may also identify state information that should be preserved, and the garbage collection manager may preserve or avoid overwriting this state information.

20 Claims, 12 Drawing Sheets

SNAPSHOT-BASED GARBAGE COLLECTION IN AN ON-DEMAND CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf of, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
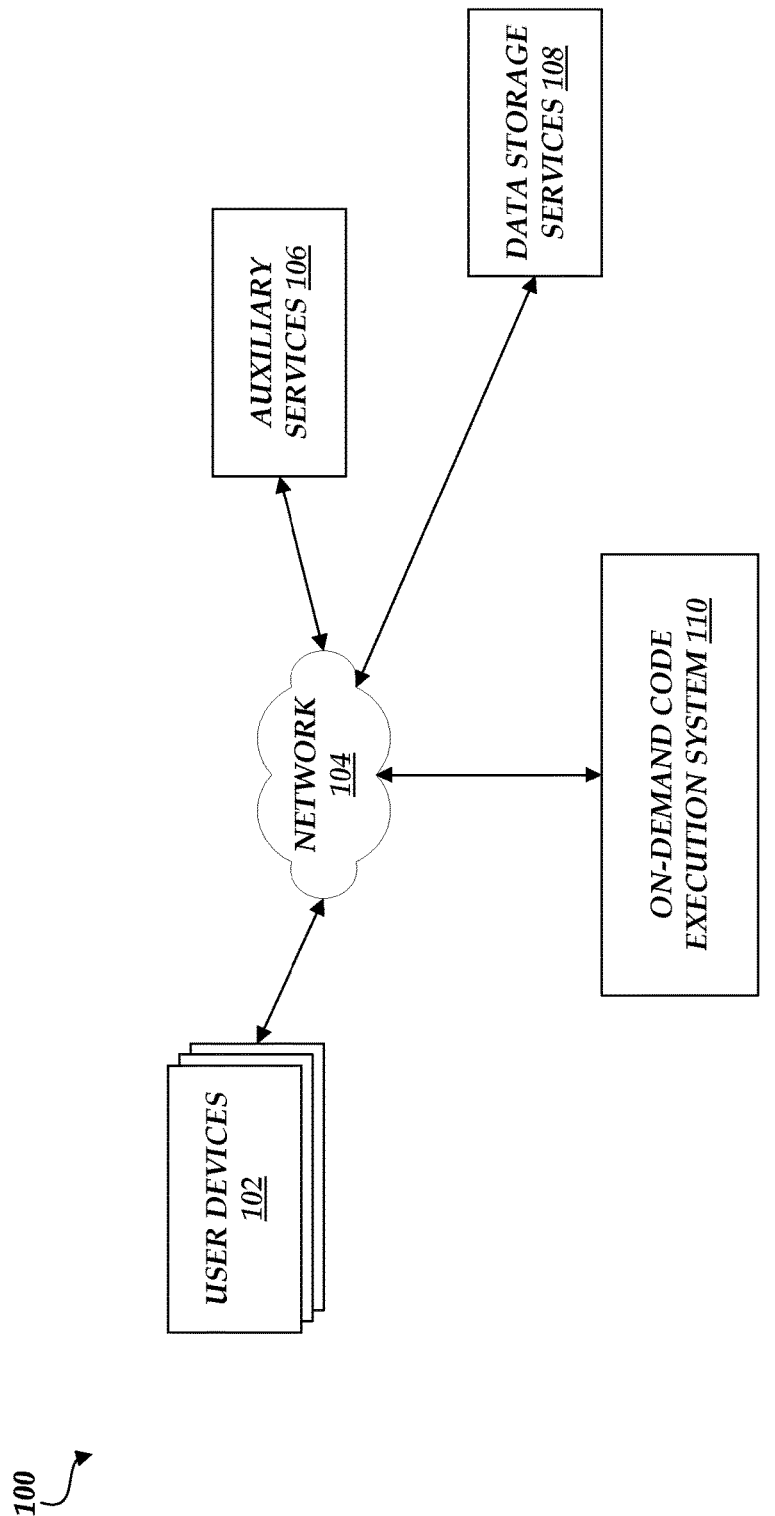
FIGS. 1A and 1B are block diagrams depicting an illustrative environment in which an on-demand code execution system can execute tasks corresponding to code, which may be submitted by users of the on-demand code execution system, and can manage garbage collection processes in accordance with aspects of the present disclosure.

Generally described, aspects of the present disclosure relate to an on-demand code execution system. The on-demand code execution system enables rapid execution of code, which may be supplied by users of the on-demand code execution system. More specifically, aspects of the present disclosure relate to improving the performance of an on-demand code execution system by implementing a garbage collection management system. As described in detail herein, the on-demand code execution system may provide a network-accessible service enabling users to submit or designate computer-executable code to be executed by virtual machine instances on the on-demand code execution system. Each set of code on the on-demand code execution system may define a "task," and may implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment.

Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a preconfigured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as any dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance.

The on-demand code execution system may therefore include multiple virtual machine instances executing various tasks on behalf of various users. During execution, these tasks may allocate and de-allocate computing resources, such as computer memory, data stores, and the like. In some embodiments, however, a task may allocate computing resources and then fail to completely de-allocate them. For example, a task may allocate a block of memory, maintain a pointer or other reference to the memory for a period of time, and then cease to maintain the pointer or reference without de-allocating the memory block. As a further example, a task may create and destroy objects in memory in such a manner that some objects remain allocated but are inaccessible to the executing task (e.g., by allocating object A that references object B, object B that references object C, object C that references object B, and then de-allocating object A, leaving objects B and C able to access each other but with no other object able to access them). Such objects and memory blocks may be referred to herein as "garbage," and the task of identifying and de-allocating these objects may be referred to herein as "garbage collection." Garbage collection may typically be performed to make the affected computing resources available for allocation again, and in some embodiments may be performed by a process that executes independently of user code. For example, a runtime for a given programming language may implement an automatic garbage collection process during execution of code. However, executing a garbage collection process generally requires resources of an execution environment, and thus may interfere with execution of code of a user-submitted task, reduce the virtual machine instance's capacity to execute the code, or degrade performance (e.g., by introducing latency).

To address these issues, an operator of an on-demand code execution system may implement a garbage collection management system. The garbage collection management system, in some embodiments, may implement "network-level" garbage collection scheduling across the entire on-demand code execution system, and may coordinate the scheduling of user-submitted task executions and garbage collection processes so that they do not interfere with the other. The garbage collection management system may thus improve the availability of computing resources and ensure that performance is consistent from one task execution to the next. Additionally, in some embodiments, the garbage collection management system may manage garbage collection at the level of the individual host computing device, and may manage resource allocation and task execution assignments to facilitate garbage collection scheduling. The system may thus reduce the risk that a virtual machine instance on a host computing device will run out of a computing resource before garbage collection can be scheduled, while still obtaining the benefits of garbage collection scheduling Still further, in some embodiments, the garbage collection management system may implement snapshot-based techniques for performing garbage collection processes, and may thereby improve the performance of the garbage collection process itself by removing the need to identify and de-allocate garbage on an item-by-item basis.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the problem of managing latency and other performance issues that are caused by the need to perform garbage collection processes. These technical problems are addressed by the various technical solutions described herein, including the provisioning of a garbage collection management system within an on-demand code execution system to facilitate the performance of garbage collection processes. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programming interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 depicted in FIG. 1B (which may in some instances represent multiple frontends 120) may be connected to the network 104, and other components of the on-demand code execution system 110 may communicate with other components of the environment 100 via the frontends 120.

In FIG. 1A, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying). In accordance with embodiments of the present disclosure, and as described in more detail below, the on-demand code execution system 110 may configure the virtual machine instances with customized operating systems to execute the user's code more efficiency and reduce utilization of computing resources.

Figure 1B:
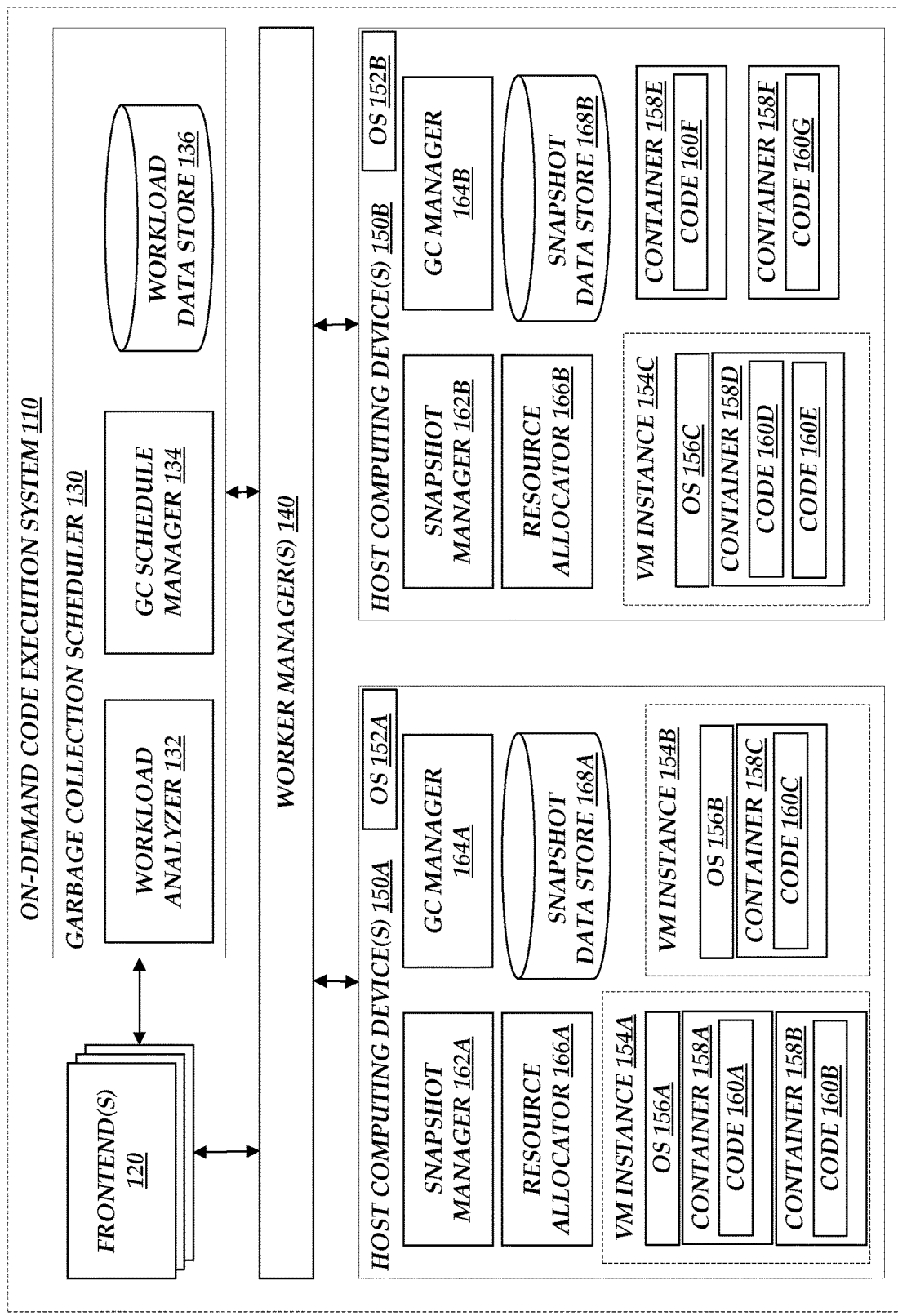

With reference now to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

In the illustrated embodiment, the on-demand code execution system 110 further includes a garbage collection scheduler 130, which is described in more detail with reference to FIG. 2 below. The garbage collection scheduler 130 implements a garbage collection schedule as described in more detail below. As illustrated, the garbage collection scheduler 130 includes a workload analyzer 132, which analyzes historical workloads on the on-demand code execution system 110 and generates forecasts that are used to create garbage collection schedules in accordance with aspects of the present disclosure. The garbage collection scheduler 130 further includes a garbage collection schedule manager 134, which may generate the garbage collection schedule and assign slots on the schedule to various garbage collection processes. The garbage collection scheduler 130 further includes a workload data store 136, which stores information regarding historical workloads, and may generally be any non-transient computer-readable data store, such as a hard drive, solid state device, magnetic medium, database, storage service, or other device or service. In some embodiments, the workload data store 136 may be implemented on or as part of the data storage services 108 or auxiliary services 106.

To execute tasks, the on-demand code execution system 110 includes one or more worker managers 140 that manage the instances used for servicing incoming calls to execute tasks. In the example illustrated in FIG. 1, each worker manager 140 manages an active pool of virtual machine instances 154A-C, which are currently assigned to one or more users and are implemented by one or more physical host computing devices 150A-B. The physical host computing devices 150A-B and the virtual machine instances 154A-C may further implement one or more containers 158A-F, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-F and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container.

The containers 156A-F, virtual machine instances 154A-C, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-C may further include operating systems 152A-B and 156A-C. In various embodiments, operating systems 152A-B and 156A-C may be the same operating system, variants of the same operating system, different operating systems, or combinations thereof.

Although the virtual machine instances 154A-C are described here as being assigned to a particular user, in some embodiments, an instance 154A-C may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-B, virtual machine instances 154A-C, and containers 158A-F may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements a virtual machine instance 154C and directly implements containers 158E and 158F, which contain user-submitted code 160F and 160G. The virtual machine instance 154C, in turn, implements container 158D, which contains user-submitted codes 160D and 160E. It will be understood that these embodiments are illustrated for purposes of example, and that many other embodiments are within the scope of the present disclosure.

The host computing devices 150A-B may each include a snapshot manager 162A-B, GC manager 164A-B, resource allocator 166A-B, and snapshot data store 168A-B, which may implement aspects of the present disclosure as described in more detail below. Illustratively, the snapshot managers 162A-B may manage the generation and restoration of snapshots of the virtual machine instances 154A-C, as described in more detail below with reference to FIGS. 5 and 9. The GC managers 164A-B may manage the scheduling of garbage collection at the level of individual virtual machine instances 154A-C, as described in more detail below with reference to FIGS. 3C, 4, 7, and 8. The resource allocators 166A-B may manage allocation of resources from a host level resource pool to the virtual machine instances 154A-C to facilitate garbage collection at scheduled times, as described in more detail below with reference to FIGS. 3C and 7. The snapshot data stores 168A-B may store the snapshots generated by the snapshot managers 162A-B as well as other information that enables schedule garbage collection, as described in more detail below with reference to FIG. 5.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to the garbage collection schedule 130 or the GC managers 164A-B.

Figure 2:
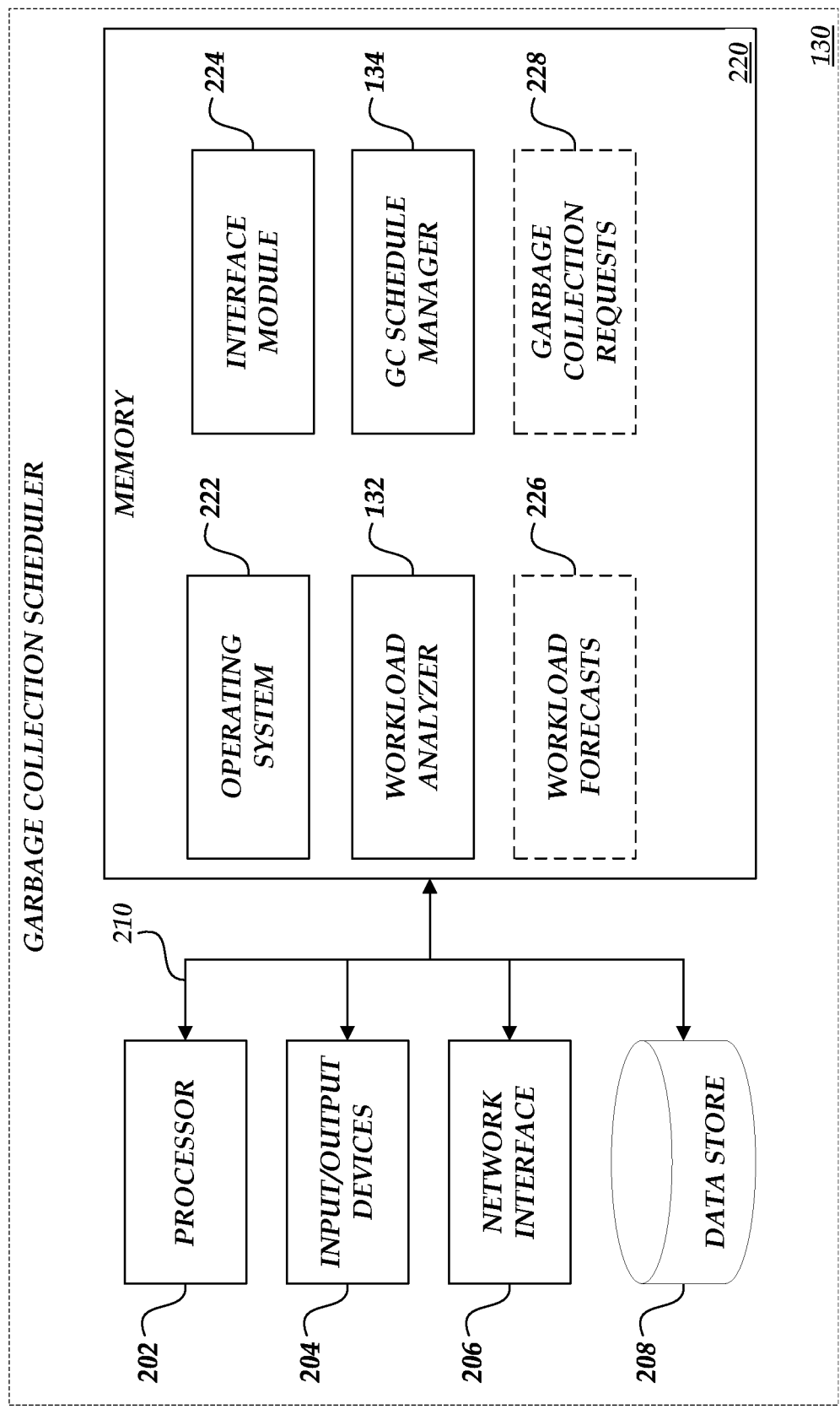
FIG. 2 depicts a general architecture of a computing device that is configured to manage garbage collection processes in accordance with aspects of the present disclosure.

FIG. 2 depicts a general architecture of a computing system (referenced as garbage collection scheduler 130) that operates to manage garbage collection at a network level within the on-demand code execution system 110. The general architecture of the garbage collection scheduler 130 depicted in FIG. 2 includes an arrangement of computer hardware and software modules that may be used to implement aspects of the present disclosure. The hardware modules may be implemented with physical electronic devices, as discussed in greater detail below. The garbage collection scheduler 130 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIGS. 1A-B. As illustrated, the garbage collection scheduler 130 includes a processor 202, input/output device interfaces 204, a network interface 206, and a data store 208, all of which may communicate with one another by way of a communication bus 210. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown).

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the garbage collection scheduler 130. The memory 220 may further include computer program instructions and other information for implementing aspects of the present disclosure. For example, in one embodiment, the memory 220 includes an interface module 224 that generates interfaces (and/or instructions therefor) for interacting with the frontends 120, worker managers 140, or other computing devices, e.g., via an API, CLI, and/or Web interface. In addition, the memory 220 may include and/or communicate with one or more data repositories (not shown), for example, to access user program codes and/or libraries.

In addition to and/or in combination with the interface module 224, the memory 220 may include a workload analyzer 132 and garbage collection schedule manager 134 that may be executed by the processor 202. In one embodiment, the workload analyzer 132 and garbage collection schedule manager 134 implement various aspects of the present disclosure, e.g., generating and managing a network-level garbage collection schedule, as described further below. While the workload analyzer 132 and garbage collection schedule manager 134 shown in FIG. 2 as part of the garbage collection scheduler 130, in other embodiments, all or a portion of the workload analyzer 132 or garbage collection schedule manager 134 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the garbage collection scheduler 130.

The memory 220 may further include workload forecasts 226 and garbage collection requests 228, which may be loaded into memory in conjunction with generating and maintaining a garbage collection schedule for the on-demand code execution system 110. In some embodiments, the memory 220 may further include, e.g., information regarding particular virtual machine instances, particular requests to execute user-submitted tasks, or other information that is used to generate or maintain the garbage collection schedule.

In some embodiments, the garbage collection scheduler 130 may further include components other than those illustrated in FIG. 2. For example, the memory 220 may further include information regarding pending requests to execute user-submitted tasks, timing information regarding previously executed garbage collection processes, or other information that facilitates garbage collection scheduling. FIG. 2 is thus understood to be illustrative but not limiting.

Figure 3A:
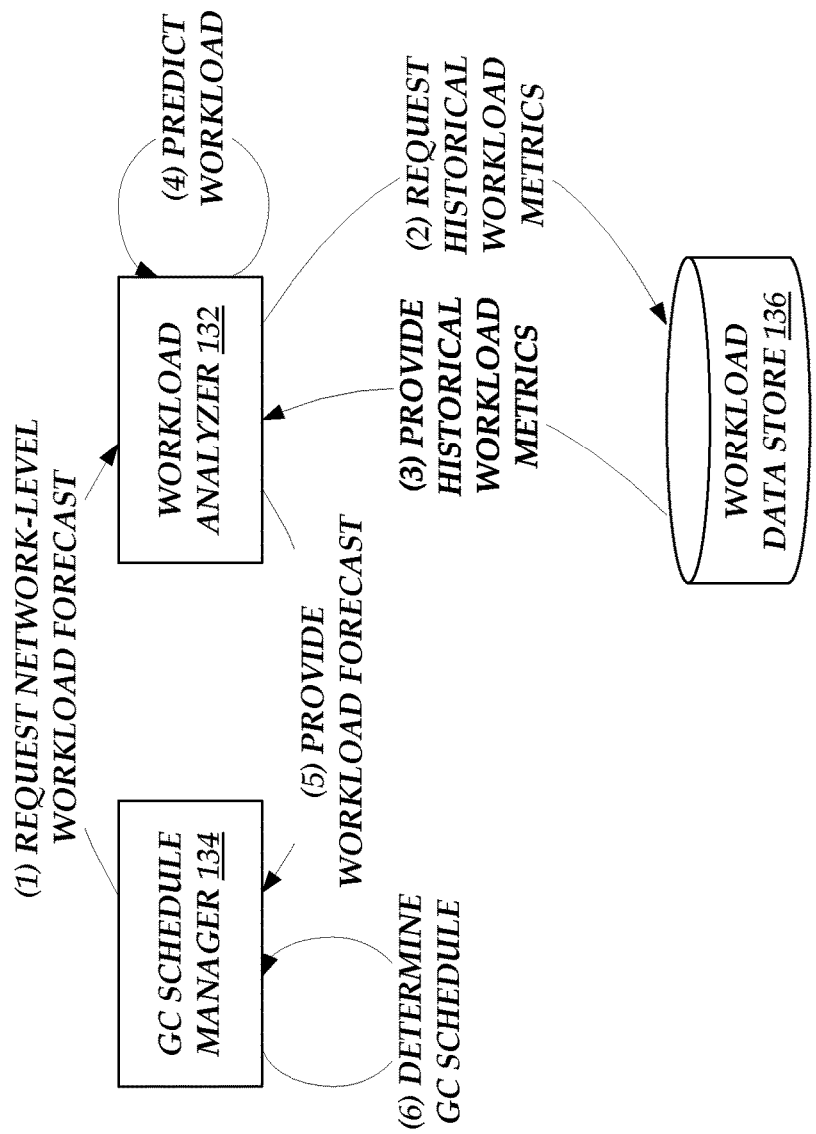
FIGS. 3A, 3B, and 3C are flow diagrams depicting illustrative interactions for generating and maintaining a garbage collection schedule in accordance with aspects of the present disclosure.
Figure 3B:
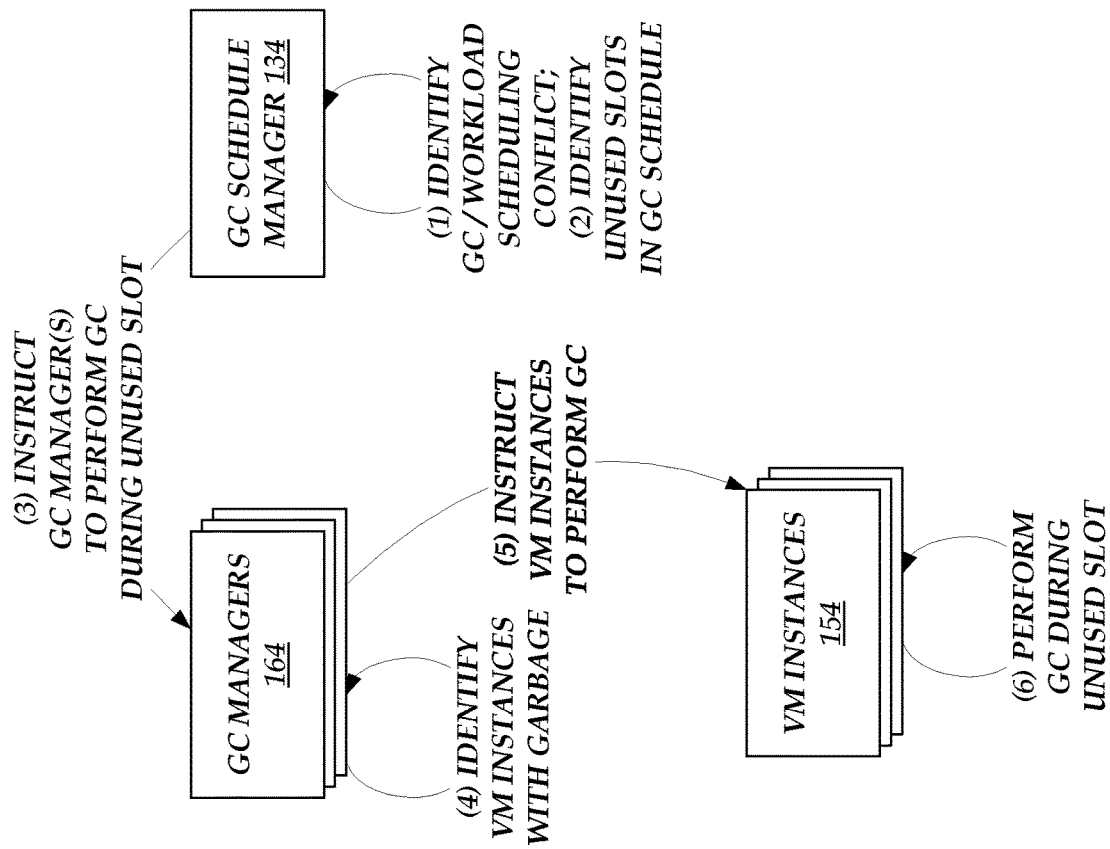
Figure 3C:
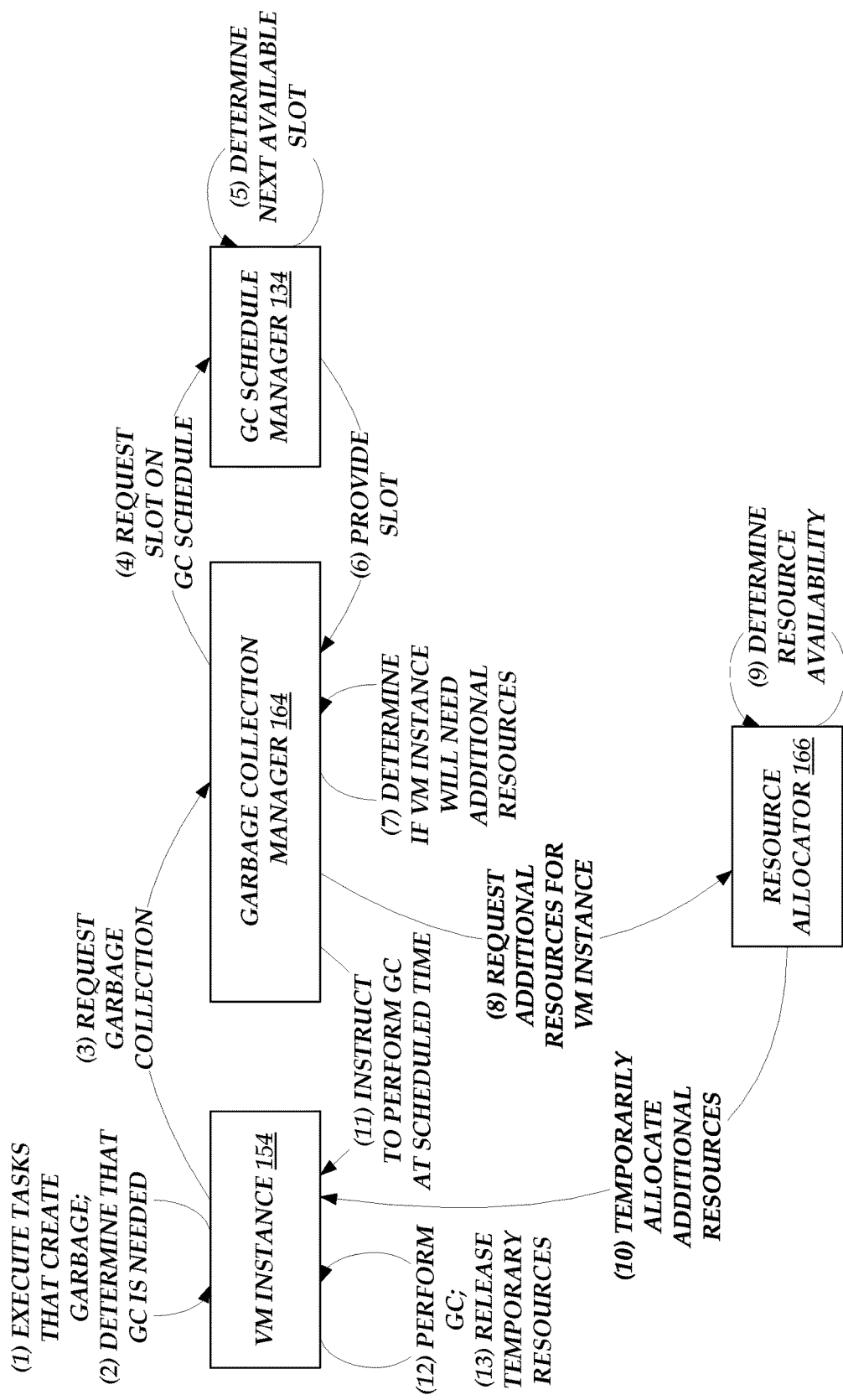

FIGS. 3A, 3B, and 3C depict illustrative interactions for generating and managing a network-level garbage collection schedule in accordance with aspects of the present disclosure. As discussed above, the illustrative interactions may allow an on-demand code execution system to provide more consistent performance when executing tasks, rather than incurring latency or other costs associated with executing garbage collection routines during some task executions but not others. With reference now to FIG. 3A, at (1), a garbage collection schedule manager 134 requests a network-level workload forecast from the workload analyzer 132. As used herein, the term "network-level" may generally refer to workload forecasts, garbage collection schedules, etc., that span more than one host computing device 150 in the on-demand code execution system 110 of FIG. 1B. The network-level workload forecast may thus be understood to be a forecast of tasks that the system 110 is expected to perform (e.g., in response to requests) along with the corresponding workload metrics for execution of those tasks (e.g., the amount or percentage of the computing resources of the system 110 that execution of these tasks will consume).

At (2), the workload analyzer 132 may request historical workload metrics from the workload data store 136. Illustratively, the workload data store 136 may contain historical data regarding usage of computing resources by the on-demand code execution system 110. In some embodiments, the historical workload metrics may include information regarding previous workload metrics at, e.g., particular times of day, days of the week, demand for computing resources in a particular geographic region, demand for computing resources of a particular type (e.g., a particular processor or operating system), and so forth. At (3), workload data store 136 provides the requested historical workload metrics.

At (4), the workload analyzer 132 uses the obtained historical workload metrics to predict future workload metrics for the on-demand code execution system 110. In some embodiments, a machine learning model trained on previous workload metrics of the system 110 may be used to predict the future workload metrics. In another embodiment, statistical techniques, such as regression analysis, may be used to predict future workload metrics. Illustratively, a workload forecast may be generated that indicates, at various future times, an amount or percentage of the resources of the system 110 that will be required for execution of user submitted tasks. As a simplified example, the workload forecast may indicate that, on a given day, user-submitted tasks will consume 60% of system resources between midnight and 6:00 a.m., 90% of resources between 6:00 a.m. and 8:00 a.m., 70% of resources between 8:00 a.m. and 11:00 a.m., 100% of resources between 11:00 a.m. and 1:00 p.m., and so forth. At (5), the workload analyzer 132 provides the workload forecast to the garbage collection schedule manager 134.

At (6), the garbage collection schedule manager 134 determines a garbage collection schedule. Illustratively, the garbage collection schedule manager 134 may use the resource forecast to determine a schedule that includes more garbage collection processes at times when user demand for system resources is relatively low, and that includes fewer or no garbage collection processes at times when forecasted demand is relatively high. For example, the garbage collection schedule may include a number of timeslots that virtual machine instances can request and reserve, and the number of timeslots available may be such that garbage collection processes can consume up to 40% of system resources between midnight and 6:00 a.m., 10% of system resources between 6:00 a.m. and 8:00 a.m., and so forth.

With reference now to FIG. 3B, example interactions for performing garbage collection processes in accordance with the schedule generated in FIG. 3A will be described. At (1), in some embodiments, the garbage collection schedule manager 134 may identify points in time at which the user demand for system resources may reduce the resources available for garbage collection processes such that not all requests for garbage collection processes can be satisfied at the given point in time. Continuing the example above, the garbage collection schedule manager 134 may identify the time periods of 6:00 a.m. to 8:00 a.m. or 11:00 a.m. to 1:00 p.m. as times when user-submitted tasks and garbage collection processes may combine to exceed the available system resources. At (2), the garbage collection schedule manager 134 may identify an earlier open timeslot on the schedule, representing a time at which system resources are available for garbage collection (which, in some embodiments, may be the current time) and no virtual machine instance has requested to perform garbage collection. In some embodiments, the interaction at (1) may be omitted, and the garbage collection schedule manager 134 may identify unused timeslots regardless of whether there is a potential scheduling conflict.

At (3), the garbage collection schedule manager 134 may instruct one or more garbage collection managers 164 to perform garbage collection during the identified timeslot, which may be sooner than the time at which a garbage collection process would have been scheduled otherwise. Illustratively, the garbage collection managers 164 may each manage requests to schedule garbage collection for the individual virtual machine instances 154 on their respective host computing devices. As described in more detail below, these requests may be generated when, e.g., the virtual machine instance 154 or the garbage collection manager 164 determines that the virtual machine instance 154 is running low on a particular system resource, such as available and un-allocated computer memory. The garbage collection schedule manager 134 may thus instruct the garbage collection managers 164 to proactively perform a garbage collection process at the earlier identified time (which, in some embodiments, may be the current time) rather than waiting until the garbage collection process reaches a threshold level of urgency. The garbage collection schedule manager 134 may thus, in some embodiments, reschedule garbage collection processes from times at which resources would be unavailable or when garbage collection processes and user-submitted tasks would be in contention for resources (e.g., the time identified at (1)), to times at which resources are available (e.g., the time identified at (2)).

At (4), the garbage collection managers 164 may identify a virtual machine instance or instances 154 that would benefit from performing a garbage collection process. Illustratively, the garbage collection manager 164 for a particular host computing device may identify the virtual machine instance 154 that is closest to a threshold for requesting that garbage collection be scheduled. For example, the garbage collection manager 164 may manage garbage collection requests for a virtual machine instance 154A that has recently performed a garbage collection process, and a virtual machine instance 154B that has not recently performed a garbage collection process and thus has accumulated a greater amount of garbage. The garbage collection manager 164 may therefore identify virtual machine instance 154B.

At (5), the garbage collection manager 164 may instruct the identified virtual machine instance 154 to perform a garbage collection process. In some embodiments, the garbage collection manager 164 may perform the garbage collection process itself rather than instructing the virtual machine instance 154 to do so. For example, as described in more detail below, the garbage collection manager 164 may restore a snapshot of the virtual machine instance 154 that was taken prior to the virtual machine instance executing tasks and generating garbage. In other embodiments, the virtual machine instance 154 may, at (6) execute the garbage collection process during the identified timeslot. In some embodiments, the garbage collection manager 164 or the virtual machine instance 154 may notify another computing device (e.g., a frontend 120) that a garbage collection process is being performed, and may request that the workload of the virtual machine instance 154 be reduced accordingly. For example, a frontend 120 may assign user-submitted tasks to other virtual machine instances 154 that are not executing garbage collection processes, or may assign a reduced quantity of user-submitted tasks based on a predicted resource utilization of the garbage collection process.

With reference now to FIG. 3C, example interactions for requesting the scheduling of a garbage collection process will be described. At (1), a virtual machine instance 154 may execute user-submitted tasks that generate garbage. As described above, user-submitted code may allocate virtual computing resources associated with a virtual machine instance, such as memory, and then fail to completely de-allocate these resources. Over time, the memory of the virtual machine instance 154 may thus accumulate "garbage" that is not being used by any existing or previous user-submitted task, but has not been released and cannot be allocated to a new task.

At (2), the virtual machine instance 154 may determine that garbage collection is needed. Illustratively, the virtual machine instance 154 may determine that the amount of a computing resource that remains available has fallen below a threshold. For example, the virtual machine instance 154 may determine that less than half of computer memory remains available for allocation to further user-submitted task executions, or that less than a fixed quantity of computer memory remains available. In some embodiments, the virtual machine instance 154 may determine (or may receive from a frontend 120) an estimate of how much of a computing resource a particular user-submitted task will require, and may determine whether it can provide the estimated quantity. In other embodiments, the virtual machine instance 154 may determine that it should perform a garbage collection process based on an analysis of the user-submitted tasks that have been executed by the virtual machine instance 154. For example, historical data from previous executions of the user-submitted tasks or a machine learning model trained on previous executions of the user-submitted tasks may be used to determine that the virtual machine instance 154 should execute a garbage collection process. In some embodiments, the virtual machine instance 154 may provide memory usage data to the garbage collection manager 164, which may determine whether the virtual machine instance 154 needs to perform garbage collection. In other embodiments, the garbage collection manager 164 may proactively monitor the virtual machine instance 154 to detect or determine whether sufficient computing resources remain available for execution of further user-submitted tasks.

At (4), the garbage collection manager 164 requests a timeslot from the garbage collection schedule manager 134. As described in more detail below, the garbage collection schedule manager 134 may maintain a schedule of garbage collection processes that has a limited number of timeslots available. In some embodiments, the number of available timeslots for a given time may vary according to the predicted system workload. In some embodiments, the garbage collection manager 164 may request a particular future time at which to perform a garbage collection process. For example, the garbage collection manager 164 may model the execution of various tasks in a virtual machine instance 154 and predict the amount of garbage they will create. The garbage collection manager 164 may thus predict that the virtual machine instance 154 will need to execute a garbage collection process at a particular time. In other embodiments, the garbage collection manager 164 may request a slot on the garbage collection schedule for a virtual machine instance 154 that has an immediate need to execute a garbage collection process, or whose need to execute a garbage collection process exceeds a threshold as described above.

At (5), the garbage collection schedule manager 134 determines the next available timeslot in the garbage collection schedule, or, in embodiments where a particular time has been requested, identifies an open timeslot at the requested time (or, if no timeslot is open at the requested time, the open timeslot that is nearest to the requested time). At (6), the garbage collection schedule manager 134 provides the determined timeslot to the garbage collection manager 164.

At (7), the garbage collection manager 164 may determine if the virtual machine instance 154 will run out of resources before the time at which its garbage collection has been scheduled. In some embodiments, the garbage collection schedule manager 134 may approve a request to execute a garbage collection process immediately. For example, the garbage collection schedule may have an open timeslot at the current time, and may provide that open timeslot in response to the request. If so, then the interaction at (7) may be omitted. In other embodiments, however, the garbage collection manager 164 may analyze, e.g., a rate at which the virtual machine instance 154 is consuming or allocating a computing resource, and determine a likelihood that the virtual machine instance 154 will run out of the resource. In some embodiments, the likelihood may be determined based on the user-submitted tasks that are executing (or are scheduled to execute) on the virtual machine instance 154. In other embodiments, a determination may be made as to the likelihood that the amount of the resource will fall below a threshold. For example, the garbage collection manager 164 may seek to maintain a buffer or safety margin for the computing resource, and may determine that the virtual machine instance will need additional resources if it is likely that a remaining amount of the computing resource will follow the safety margin.

At (8), in some embodiments, the garbage collection manager 164, having determined that additional resources will be required, may request additional resources from the resource allocator 166. In some embodiments, the garbage collection manager 164 may determine an additional amount of the computing resources to request. For example, the garbage collection manager 164 may request an amount of the computing resource that is determined based on reducing the likelihood that the virtual machine instance 154 will run out of the resource to below a threshold. In other embodiments, the garbage collection manager 164 may request that a fixed additional amount of the computing resource be allocated to the virtual machine instance 154, or may determine an amount based on the user-submitted tasks that are executing or will soon execute on the virtual machine instance 154.

At (9), the resource allocator 166 may determine whether the requested amount of the computing resource is available to be allocated. Illustratively, the virtual machine instance 154 may be hosted on a host computing device (e.g., host computing device 150A), which may have a fixed amount of a physical computing resource. The host computing device 150A may allocate portions of this physical computing resource to various processes including virtual machine instance 154. The resource allocator 166 may thus determine whether there is any additional amount of the physical computing resource that can be allocated to the virtual machine instance 154. In some embodiments, the resource allocator 166 may determine that additional resources cannot be made available. In such embodiments, the resource allocator 166 may report to the garbage collection manager 164 that additional resources cannot be provided. The garbage collection manager 164 may then take other actions to mitigate the risk of the virtual machine instance 154 running outside of the computing resource, such as requesting an earlier slot in the garbage collection schedule, migrating user-submitted tasks to a different virtual machine instance, or reducing an advertised capacity of the virtual machine instance 154 to accept further user-submitted tasks. In other embodiments, the resource allocator 166 may determine that the requested additional resources can be made available, and at (10) may allocate the additional resources to the virtual machine instance 154. In some embodiments, the resources may be temporarily allocated to the virtual machine instance 154. In other embodiments, the resources may be permanently allocated.

At (11), the garbage collection manager 164 may instruct the virtual machine instance 154 to perform garbage collection during the timeslot obtained from the garbage collection schedule manager 134. In various embodiments, the interaction at (11) may be carried out prior to or in parallel with the interactions at (8), (9), and (10). At (12), the virtual machine instance 154 may implement the garbage collection process at the scheduled time. In some embodiments, as discussed above, the garbage collection manager 164 may perform the garbage collection process at the scheduled time rather than instructing the virtual machine instance 154 to do so. At (13), in some embodiments, the virtual machine instance 154 (or, in some embodiments, the garbage collection manager 164) may release the resources that were temporarily assigned to the virtual machine instance 154 to reduce the likelihood that the virtual machine instance 154 would run out of a computing resource before the garbage collection process could be scheduled.

It will be understood that FIGS. 3A, 3B, and 3C are provided for purposes of example, and that many variations on the depicted interactions are within the scope of the present disclosure. For example, the interaction at (11) in FIG. 3C may be deferred until the scheduled time, such that the garbage collection manager 164 may wait until the scheduled time arrives and then instruct the virtual machine instance 154 to perform garbage collection immediately. As a further example, the interaction at (11) may be carried out prior to or in parallel with the interactions at (7), (8), (9), and (10). FIGS. 3A, 3B, 3C, and 3D are thus understood to be illustrative and not limiting.

Figure 4:
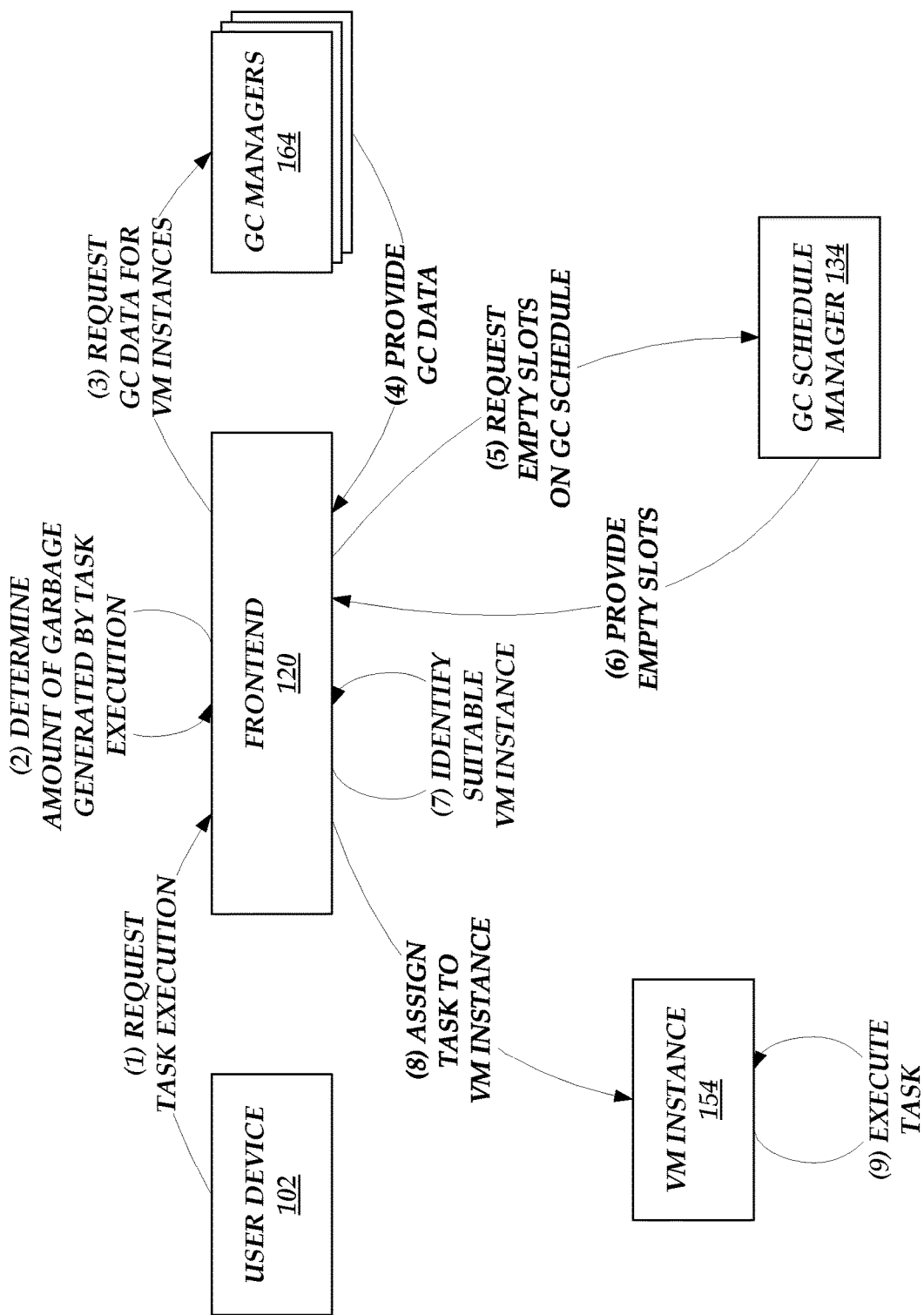
FIG. 4 is a flow diagram depicting illustrative interactions for assigning tasks to virtual machine instances according to a garbage collection schedule, in accordance with aspects of the present disclosure.

FIG. 4 depicts illustrative interactions for assigning task execution requests to virtual machine instances in a manner such that the assignments cause the virtual machine instances to schedule garbage collection processes in accordance with a garbage collection schedule. In the illustrated example, at (1), a user device 102 submits a request to execute a user-submitted task to a frontend 120 of an on-demand code execution system. In some embodiments, as described above, a request to execute a task may be generated within the on-demand code execution system. For example, a task execution may be requested based on a determination that a user-specified criterion has been satisfied, or according to a user-specified schedule for executing the requested task.

At (2), the frontend 120 determines an amount of garbage that the user-submitted task is likely to generate. Illustratively, the frontend 120 may determine an amount of garbage based on previous executions of the user-submitted task, previous executions of similar tasks, previous executions of other tasks for the same user, or other historical data. In some embodiments, the frontend 120 may analyze the code associated with the user-submitted task and identify library routines, API calls, or other characteristics that are associated with allocating and then failing to fully de-allocate a computing resource. In other embodiments, the frontend 120 may use a machine learning model trained to analyze user-submitted tasks and predict how much garbage they will generate.

At (3), the frontend 120 requests garbage collection information for various virtual machine instances 154 that may be available to execute the user-submitted tasks. The garbage collection information may include, for example, an amount of elapsed time since a garbage collection process was performed, an amount of garbage that has been generated (or, conversely, an amount of a computing resource that remains available to be allocated to new tasks), tasks that are currently executing on the virtual machine instance 154, and other information that facilitates estimating at time at which a particular virtual machine instance 154 will need to execute a garbage collection process. At (4), the garbage collection managers 164 may provide the requested information regarding managed virtual machine instances 154.

At (5), the frontend 120 may request a list of open timeslots on the garbage collection schedule. Illustratively, the garbage collection schedule may have three slots that are still available at a first time, two slots available at a second time, no slots available at a third time, and so forth. The garbage collection schedule may, in some embodiments, be divided into timeslots that are slightly more than the typical duration of execution for a garbage collection process, and these timeslots may be filled by virtual machine instances executing garbage collection processes. In further embodiments, as described in more detail above, the number of timeslots in the schedule at a given moment may be determined based on the expected resource demand associated with executing user-submitted tasks at that moment, such that the garbage collection schedule may include more timeslots for garbage collection processes when user-driven demand for system resources is low, and may include fewer or no timeslots for garbage collection processes when user-driven demand is high. At (6), the garbage collection schedule manager 134 may provide a list of open timeslots to the frontend 120.

At (7), the frontend 120 may identify a virtual machine instance 154 where assigning the user-submitted task execution would likely cause the virtual machine instance 154 to request execution of a garbage collection process at a time that coincides with an open timeslot on the garbage collection schedule. For example, the frontend 120 may determine that a task execution will generate a specified quantity of garbage (e.g., that the amount of memory a virtual machine instance 154 can make available for allocation will be reduced by 500 kilobytes after executing the user-submitted task). The frontend 120 may further determine that a particular virtual machine instance 154 will likely need to execute a garbage collection process 700 milliseconds from now if it executes the specified task, based on the amount of garbage that the virtual machine instance has accumulated and the rate at which garbage is accumulating (e.g., due to other tasks executing on the virtual machine instance 154). The frontend 120 may still further determine that there is an open timeslot on the garbage collection schedule 700 milliseconds from now. The frontend 120 may thus identify the particular virtual machine instance 154 as a suitable candidate for executing the task, and at (8) may assign the task to that instance 154.

In some embodiments, the frontend 120 may identify suitable virtual machine instances 154 based on criteria such as a number or percentage of available timeslots in the garbage collection schedule. For example, the frontend 120 may identify instances 154 in a manner that evenly distributes garbage collection processes across the available timeslots, or to reduce the possibility that a high volume of virtual machine instances will all request scheduling of garbage collection processes at the same time. In other embodiments, the frontend 120 may determine or obtain a short-term horizon for its scheduling efforts, and may identify a virtual machine instance 154 having sufficient available computing resources, such that assigning the task would not significantly increase the likelihood that the instance 154 will need to execute a garbage collection process in the short term. In further embodiments, the frontend 120 may iteratively analyze a number of virtual machine instances 154 to assess the scheduling impact of assigning the task on each instance 154, and may select a "best" instance from among the candidates based on, e.g., the criteria described above. Other variations on selecting a suitable virtual machine instance 154 are within the scope of the present disclosure. For example, the frontend 120 may determine a probability that a virtual machine instance will fail to satisfy a performance threshold for executing the task because it is scheduled to execute (or is executing) a garbage collection process. If the probability exceeds a probability threshold, the frontend 120 may therefore select an alternate virtual machine instance to execute the task. The performance threshold may illustratively be an average latency associated with executing the task, a maximum latency, the total amount of computing resources utilized by executing the task and the garbage collection process in parallel, or another criterion.

At (9), the virtual machine instance 154 to which the task has been assigned may execute the task. In some embodiments, as described above, executing the user-submitted task may cause the virtual machine instance 154 to request scheduling of a garbage collection process upon completion of the user-submitted task, and the request to schedule the garbage collection process may be managed by carrying out the interactions depicted in FIG. 3C. In other embodiments, executing the user-submitted task may cause the time at which the virtual machine instance 154 requests to schedule a garbage collection process to coincide with an open timeslot on the garbage collection schedule.

It will be understood that FIG. 4 is provided for purposes of example, and that many variations on the depicted interactions are within the scope of the present disclosure. For example, the interactions at (5) and (6) may precede or be carried out in parallel with the interactions at (3) and (4), or may preceded or be carried out in parallel with the interaction at (2). As further examples, the frontend 120 may classify user-submitted tasks as generating high, medium, or low amounts of garbage, or may classify virtual machine instances 154 has having a long, medium, or short amount of time before needing to execute a garbage collection process, and may assign tasks to instances 154 accordingly (e.g., in a manner that distributes execution of garbage collection processes across the open timeslots in the schedule). FIG. 4 is thus understood to be illustrative and not limiting.

Figure 5:
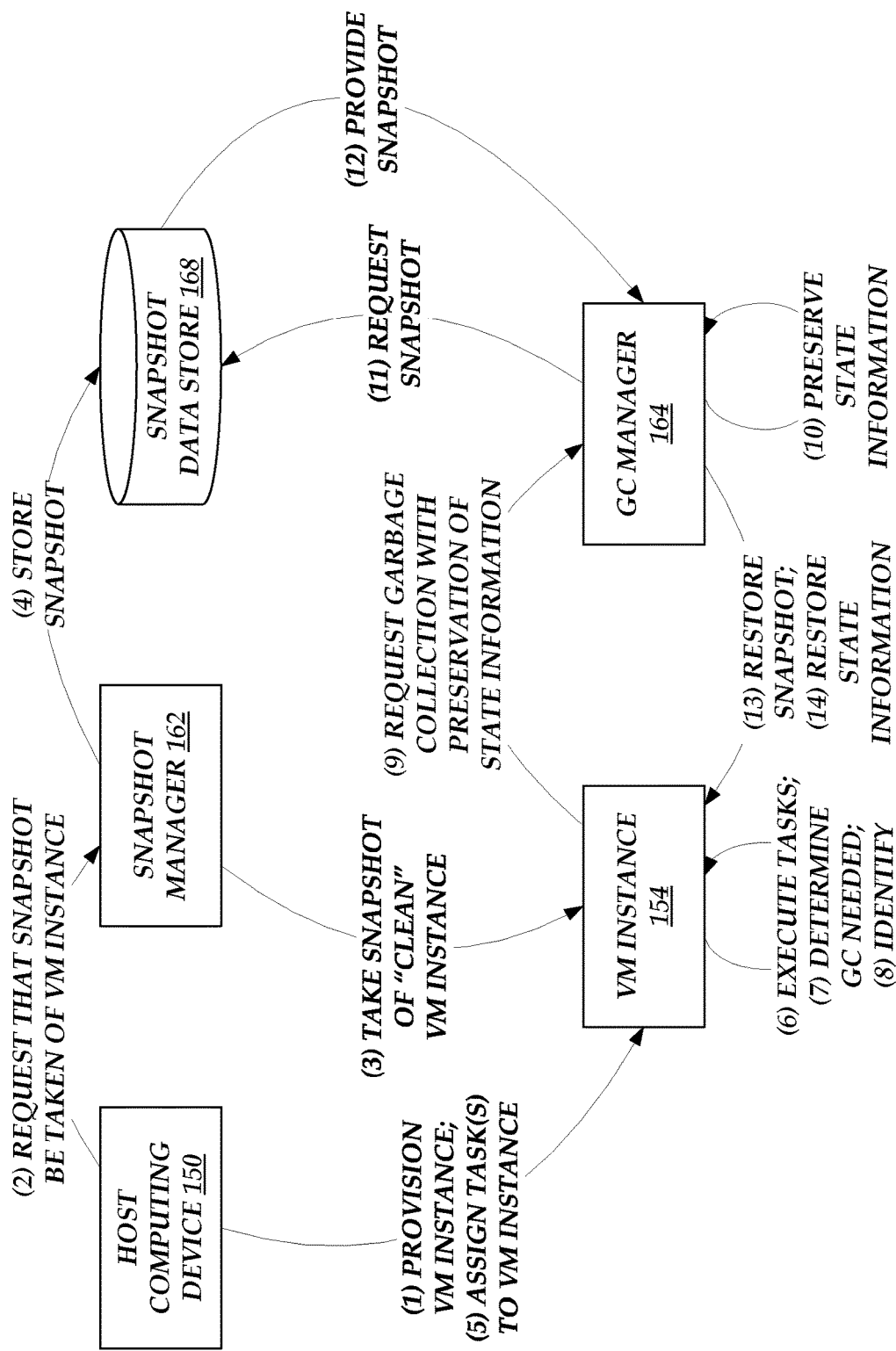
FIG. 5 is a flow diagram depicting illustrative interactions for using snapshots to perform garbage collection on a virtual machine instance in accordance with aspects of the present disclosure.

FIG. 5 depicts illustrative interactions for executing a garbage collection process by taking a snapshot of a virtual machine instance 154 in a "pre-garbage" state and then restoring the snapshot, rather than identifying and collecting garbage by analyzing the allocations of computing resources. The interactions may thus reduce the time and resources needed to perform garbage collection, since taking and restoring the snapshot may be more efficient than conventional techniques for identifying and de-allocating garbage on a per-item basis. In various embodiments, snapshots may be taken and restored using various techniques known to those skilled in the art. At (1), a host computing device 150 may provision a virtual machine instance 154 and configure the instance 154 to execute user-submitted tasks. In some embodiments, the host computing device 150 may load a preconfigured instance 154 and allocate computing resources (e.g., memory, processors, storage devices, etc.) to the preconfigured instance 154. The host computing device may also load operating systems, software libraries, applications, compilers or interpreters for various programming languages, or other content or resources during the provisioning and configuring of the virtual machine instance 154. In some embodiments, the interaction at (1) may be omitted and the interactions at (2)-(10) may be carried out on a previously provisioned virtual machine instance 154.

At (2), the host computing device 150 may request that the snapshot manager 164 take a snapshot of the virtual machine instance 154. In some embodiments, the host computing device 150 may request a snapshot when the instance 154 is fully provisioned and configured, and is ready to begin executing user-submitted tasks. In other embodiments, the host computing device 150 may request a snapshot based on a criterion being satisfied. For example, the instance 154 may be assigned to execute a user-submitted task that is known to generate a large quantity of garbage. The host computing device 150 may thus determine that it would be more efficient to take a snapshot than to collect the large quantity of garbage by executing a conventional garbage collection process, based on resource costs associated with generating and restoring the snapshot and resource costs associated with the conventional garbage collection process.

At (3), the snapshot manager 162 may take a snapshot of the virtual machine instance 154. In various embodiments, the snapshot may include a page table indicating how virtualized memory has been allocated within the virtual machine instance, contents of the virtualized memory, registers of a virtual processor, or other information that facilitates restoring the virtual machine instance 154 to a state with less or no accumulated garbage. At (4), the snapshot manager 164 may store the obtained snapshot in the snapshot data store 168.

At (5), the host computing device 150 may send one or more user-submitted tasks to the virtual machine instance 154 for execution. In some embodiments, the host computing device 150 may assign the tasks to the specified virtual machine instance 154. In other embodiments, another computing device (e.g., the frontend 120) may make the assignment, and the host computing device 150 may pass on the instruction to execute the task to the appropriate virtual computing instance 154. At (6), the virtual machine instance 154 may execute the user-submitted tasks. Illustratively, as described in more detail above, the virtual machine instance 154 may allocate and then partially de-allocate computing resources (e.g., memory) during execution of the user-submitted tasks, and the portions of the resources that are not deallocated may accumulate as garbage.

At (7), the virtual machine instance 154 (or, in some embodiments, the host computing device 150 or the garbage collection manager 164) may determine that garbage collection is needed. As described above, the determination may be based on various criteria, such as the amount of a computing resource that remains available for allocation, the rate at which a computing resource is being allocated and not de-allocated (e.g., allocation rate of virtualized memory), the expected resource demands of pending user-submitted tasks, or other factors.

At (8), in some embodiments, the virtual machine instance 154 or another computing device may identify state information that should be preserved (e.g., that should survive the restoration of a snapshot). For example, the virtual machine instance 154 may identify network connections that have been established, objects or data that should be preserved in the virtualized memory, contents of registers of virtual processors, or other information. In some embodiments, the identified state information may improve the performance of future task executions if preserved. For example, preserving an open network connection may allow future user tasks to execute without having to first re-establish the network connection, or preserving an object or data in memory may allow future user tasks to access the object or data. In some embodiments, state information may include an object or data in a kernel space page of the virtualized memory, page table entries associated with user space pages in the virtualized memory, or other content of a page table associated with virtualized memory.

At (9), the virtual machine instance 154 may request that the garbage collection manager 164 perform a garbage collection process on the virtual machine instance 154, and in some embodiments may request that previously identified state information be preserved. The garbage collection process may illustratively include preserving the identified state information, restoring the snapshot taken at (3), and then restoring the identified state information. In some embodiments, the garbage collection manager 164 may determine that the garbage collection process should be performed rather than receiving a request to perform the task. At (10), in some embodiments, the garbage collection manager 164 may preserve the identified state information. In some embodiments, the state information may be passed to the garbage collection manager 164 as part of the request to perform the garbage collection process. In other embodiments, the garbage collection manager 164 may collect the state information from the virtual machine instance 154.

At (11), the garbage collection manager 164 may request the snapshot that was previously stored at (4) from the snapshot data store 168, and at (12) the snapshot data store 168 may provide the requested snapshot. At (13), the garbage collection manager 164 may restore the snapshot. In some embodiments, restoring the snapshot may cause some or all of the preserved state information to be overwritten on the virtual machine instance 154. The garbage collection manager 164 may thus, at (14), restore the state information. In other embodiments, the garbage collection manager 164 may identify information in the snapshot that would overwrite the preserved state information on the virtual machine instance 154, and exclude this information when restoring the snapshot.

In some embodiments, the garbage collection manager 164 may determine that the virtual machine instance 154 will not need to perform a garbage collection process because the instance 154 can be de-provisioned before it runs out of a computing resource. For example, the amount of memory available for further allocation to user tasks on the virtual machine instance 154 may drop below a threshold. However, historical data regarding previous executions of the user tasks that are currently executing on the instance 154 may indicate that no further memory allocations will be required, or that the amount of further memory allocations will be less than the remaining available memory. The garbage collection manager 164 may thus deny, defer, or ignore the request to perform a garbage collection process on the instance 154 until after the currently executing tasks have completed their executions. In some embodiments, the host computing device 150 may then de-provision the instance 154 and free its computing resources for re-allocation (e.g., to other virtual machine instances) and thereby avoid the need to perform garbage collection on the instance 154. In further embodiments, one or more components the on-demand code execution system 110 may determine whether to defer or avoid garbage collection when any activity is performed that may involve de-provisioning the virtual machine instance 154, such as performing a maintenance activity on the host computing device 150.

It will be understood that FIG. 5 is provided for purposes of example, and that many variations on the depicted interactions are within the scope of the present disclosure. For example, the snapshot manager 162 may maintain a library of snapshots of preconfigured virtual machine instances 154, and may omit or only partially carry out the interactions at (3) and (4) when a preconfigured virtual machine instance 154 is provisioned at (1). As a further example, the determination of what state information to preserve may be made when or before the snapshot is taken (i.e., at or before the interaction at (3)), such that only the state information that will not be preserved is captured in the snapshot and later restored. FIG. 5 is thus understood to be illustrative and not limiting.

Figure 6:
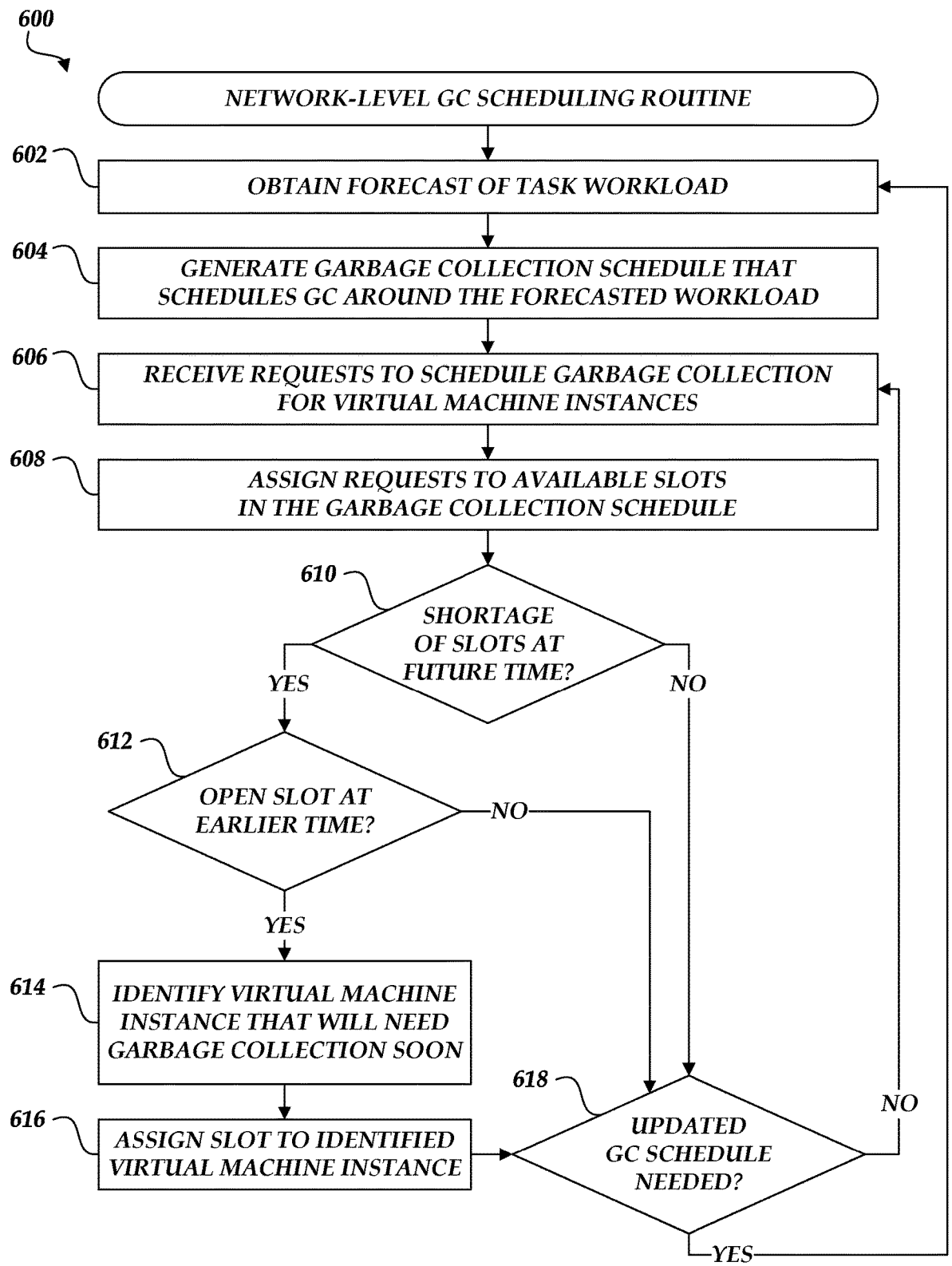
FIG. 6 is a flow chart depicting an illustrative routine for generating and maintaining a network-level garbage collection schedule in the on-demand code execution system of FIGS. 1A-1B.

FIG. 6 is a flow diagram of an illustrative routine 600 for scheduling garbage collection at the network level in accordance with aspects of the present disclosure. The routine 600 may be carried out, for example, by the garbage collection schedule manager 130 of FIG. 1B. The routine 600 begins at block 602, where a forecast of network-level workload associated with user-submitted tasks may be obtained. The forecast may specify, for example, that user-submitted tasks are expected to consume various amounts or percentages of available computing resources over various future time periods. In some embodiments, as described above, the forecast may be generated based on historical user demand for computing resources in an on-demand code execution system. Additionally, in various embodiments, the forecast may include scheduled workloads, planned maintenance activities, or demand from other sources for the available computing resources of the on-demand code execution system.

At block 604, a garbage collection schedule may be generated that schedules garbage collection activities around the forecasted workload. As a simplified example, if the forecasted workload is expected to consume 70% of available computing resources at a first time, 80% of available computing resources at a second time, and 100% of available computing resources at a third time, then a garbage collection schedule may be generated that allocates 20% of computing resources to garbage collection processes at the first time, 10% of computing resources at the second time, and 0% of computing resources at the third time. Illustratively, the garbage collection schedule may allocate computing resources as timeslots corresponding to execution of an individual garbage collection process, based on the computing resources that the garbage collection process is predicted to require. The computing resources that a garbage collection process is predicted to require may be determined, for example, based on previous executions of the garbage collection process. To continue the previous example, if a garbage collection process typically consumes 5% of available computing resources, then the garbage collection schedule may have four open slots at the first time, two open slots at the second time, and no open slots at the third time.

At block 606, requests may be received to schedule garbage collection processes for virtual machine instances. Illustratively, as described in more detail above, requests may be generated by garbage collection managers on individual host computing devices, which may determine that a virtual machine instance hosted on the host computing device satisfies a threshold or other criterion with regard to available computing resources. At block 608, the requests may be scheduled by assigning available slots in the garbage collection schedule to the virtual machine instances associated with the requests. In some embodiments, the requests may be for the earliest available timeslot, and the timeslots may be assigned accordingly (e.g., on a "first come, first served" basis). In other embodiments, the requests may specify a future time at which to schedule a garbage collection process, and the requests may be assigned to timeslots corresponding to the future time (or the nearest available time, if no timeslots are available at the requested time). In some embodiments, requests may be assigned a timeslot that is no later than the requested time, if such a timeslot is available, and the earliest timeslot available if not.

At decision block 610, a determination may be made as to whether there is a future time on the garbage collection schedule for which few or no timeslots are available. Illustratively, a peak demand time may occur when most or all of the available timeslots for a given future time have been taken, or when the garbage collection schedule as originally generated included few or no timeslots at the future time (e.g., because user demand for computing resources was predicted to be high). In some embodiments, the determination may be made based on a predicted future demand for garbage collection timeslots, which may be based on historical demand for timeslots. Additionally, in some embodiments, the routine 600 may only analyze future times that are within a specified duration of the current time.

If the determination at decision block 610 is that a peak demand time will occur at some point in the future, then at decision block 612 a determination may be made as to whether a timeslot is available at an earlier time (e.g., now, or between now and the point in time at which a shortage is predicted). If so, then at block 614 a virtual machine instance may be identified that is predicted to need garbage collection at or near the future time. In some embodiments, a virtual machine instance may be identified for which a timeslot on the garbage collection schedule has not yet been requested, but that is most in need of garbage collection among such instances. In further embodiments, a determination may be made as to whether the identified instance would benefit from performing garbage collection ahead of schedule, and whether the benefits of doing so would outweigh the resource costs associated with executing the garbage collection process more frequently. At block 616, the identified timeslot is assigned to the identified virtual machine instance, which causes a garbage collection process to be performed on the virtual machine instance at the identified time. In various embodiments, the garbage collection process may be performed by the virtual machine instance, a garbage collection manager, a host computing device, or another component of the on-demand code execution system.

If no future shortages are identified in the garbage collection schedule, or if no earlier timeslots are available to mitigate the future shortage, or after an available earlier timeslot is assigned to a virtual machine instance, the routine 600 continues at decision block 618, where a determination may be made as to whether an updated garbage collection schedule is needed. Illustratively, an updated garbage collection schedule may be needed if the actual workload associated with user-submitted tasks has deviated significantly from the forecasted workload, if the routine 600 is consistently branching from decision block 612 to decision block 618 (which may indicate that the system has a general shortage of garbage collection timeslots), or simply if the end of the previously generated garbage collection schedule is approaching. If the determination is than an updated schedule is needed, then the routine 600 may branch to block 602, obtain an updated forecast of task workload, and iterate through generating an updated schedule and making further timeslot assignments. If the determination at decision block 618 is that an updated schedule is not needed, then the routine 600 may branch to block 606 and continue processing requests to schedule garbage collection processes until an updated schedule is needed.

It will be understood that FIG. 6 is provided for purposes of example, and that many variations on the illustrated routine 600 are within the scope of the present disclosure. For example, block 602 may be omitted and the routine 600 may obtain a previously generated garbage collection schedule from an external source. As a further example, decision block 612 may precede decision block 610, and the routine 600 may first identify an unused timeslot (e.g., a timeslot at the present time that is about to go unused) and then identify a virtual machine instance that is likely to request a garbage collection timeslot at an oversubscribed future time. FIG. 6 is thus understood to be illustrative and not limiting.

Figure 7:
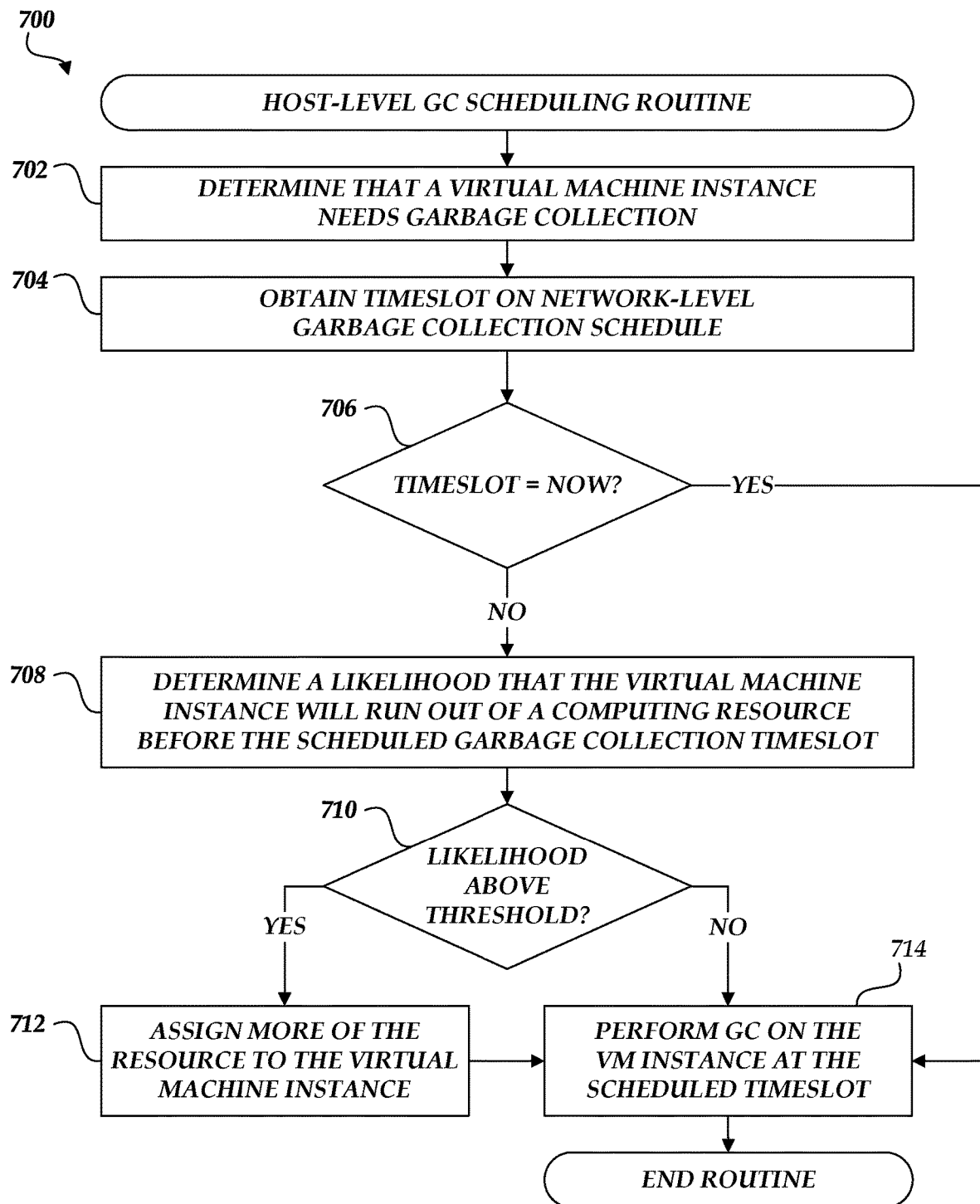
FIG. 7 is a flow chart depicting an illustrative routine for host-level management of scheduled garbage collection in the on-demand code execution system of FIGS. 1A-1B.

FIG. 7 is a flow diagram of an illustrative routine 700 for managing garbage collection at the host level in accordance with aspects of the present disclosure. The routine 700 may be carried out, for example, by the garbage collection managers 164A-B depicted in FIG. 1B. The routine 700 begins at block 702, where a determination may be made that a virtual machine instance needs garbage collection. Illustratively, the determination may be that the virtual machine instance is running out of a computing resource that has been allocated but not fully de-allocated by currently executing or previously executed tasks on the virtual machine instance. As described in more detail above, the determination may be based on a threshold quantity or percentage of the computing resource being available for allocation to further tasks, the quantity of the computing resource that further tasks are expected to require, a rate at which the computing resource is being consumed, or other factors. In various embodiments, the determination may be made by the virtual machine instance itself, a garbage collection manager that monitors the virtual machine instance, a host computing device that hosts the virtual machine instance, or another component of an on-demand code execution system.

At block 704, a timeslot may be obtained on a network-level garbage collection schedule, such as the schedule generated by the example routine 600 depicted in FIG. 6. In various embodiments, the timeslot may be defined by a start time, an end time, a duration, or various combinations thereof. At decision block 706, a determination may be made as to whether the timeslot correspond to the current time. If so, then the routine 700 branches to block 714, where a garbage collection process may be performed on the virtual machine instance in question. In various embodiments, as described in more detail above, the garbage collection process may be performed by the virtual machine instance itself, the garbage collection manager, the host computing device, or another component of the system.

If the determination at decision block 706 is that the timeslot is a future timeslot, then at block 708 a likelihood may be determined as to whether the virtual machine instance will run out of a computing resource (or, in some embodiments, whether an available quantity of the computing resource will fall below a safety margin or other threshold) before the time at which garbage collection has been scheduled to occur. At decision block 710, a determination may be made as to whether this likelihood satisfies a threshold, and if so then at block 712 an additional quantity of the computing resource may be assigned to the virtual machine instance. In some embodiments, as described above, the quantity of the computing resource may be determined as the quantity that lowers the likelihood to be below the threshold. In other embodiments, the quantity may be determined based on the predicted requirements of a user-submitted task or tasks, or a fixed quantity may be assigned. If the determination at decision block 710 is instead that the likelihood of the virtual machine instance running out of a computing resource is below a threshold, or after additional resources are assigned to the virtual machine instance, then the routine 700 proceeds to block 714 where the garbage collection process may be performed at the scheduled timeslot. The routine 700 then ends.

It will be understood that FIG. 7 is provided for purposes of example, and that many other variations on the illustrated routine 700 are within the scope of the present disclosure. For example, the routine 700 may include de-allocating the additional resources assigned at block 712 and returning them to a resource pool. As a further example, the threshold at decision block 710 may be determined based on factors such as overall system workload (e.g., the system may accept a higher probability of running out of system resources if the demand for system resources is already high), a performance guarantee associated with a user-submitted task, or other criteria. FIG. 7 is thus understood to be illustrative and not limiting.

Figure 8:
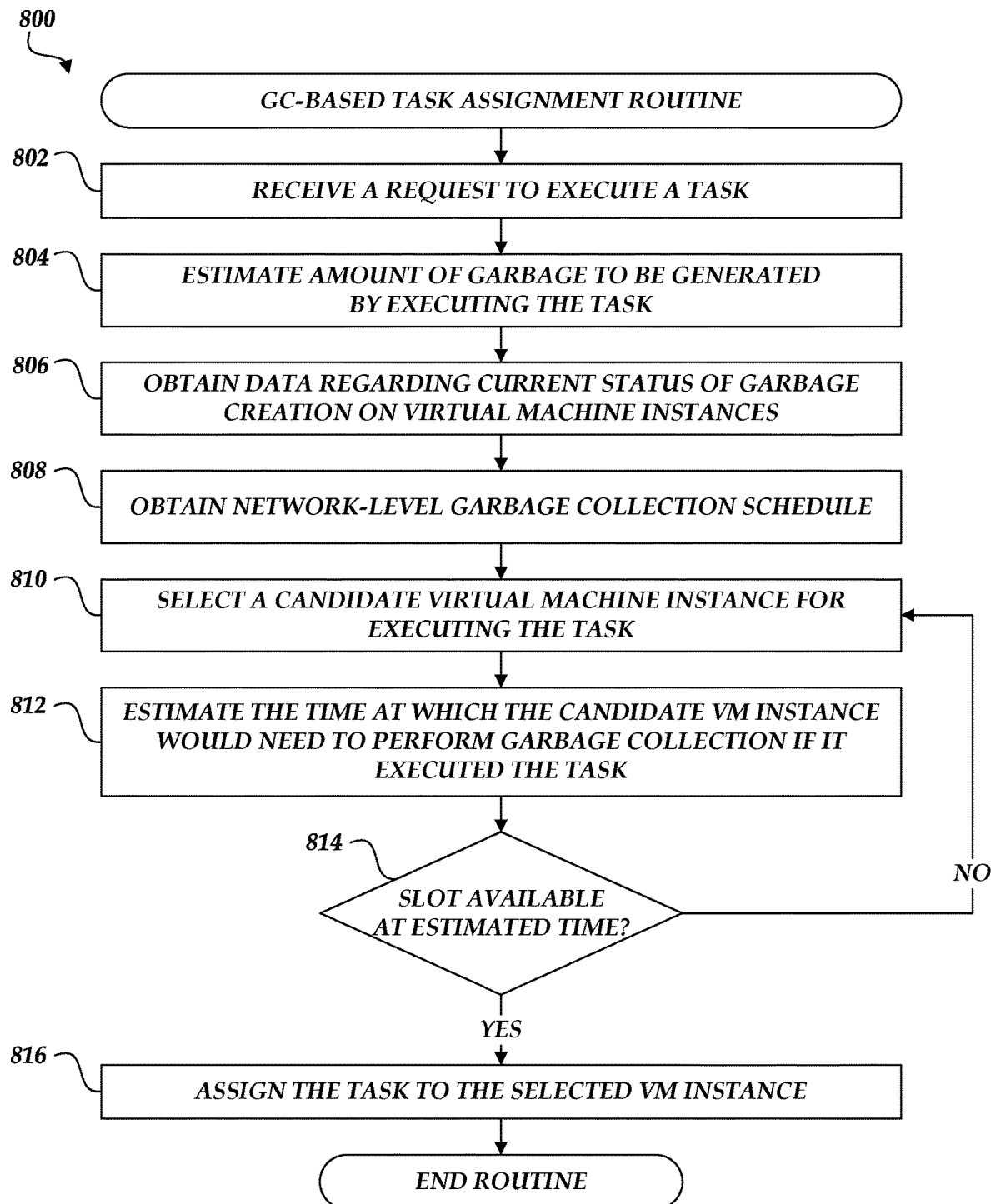
FIG. 8 is a flow chart depicting an illustrative routine for assigning tasks to virtual machine instances in the on-demand code execution system of FIGS. 1A-1B in accordance with a network-level garbage collection schedule.

FIG. 8 is a flow diagram of an illustrative routine 800 for assigning tasks to virtual machine instances to facilitate scheduled garbage collection in accordance with aspects of the present disclosure. The routine 800 may be carried out, for example, by the frontend 120 depicted in FIG. 1B. The routine 800 begins at block 802, where a request to execute a user-submitted task may be received. At block 804, a quantity of garbage that will be generated by executing the task may be estimated. In various embodiments, as described above, the quantity of garbage may be estimated based on previous executions of the task, analysis of the code corresponding to the task, a machine learning model trained to predict garbage quantities, or other factors. At block 806, data may be obtained regarding the current status of virtual machine instances with regard to accumulated garbage and forecasted needs to perform garbage collection processes. Illustratively, the data may include information such as the rates at which various virtual machine instances are generating garbage, the amount or percentage of computing resources that remain available for further allocation, times at which garbage collection processes were previously executed, and other information.

At block 808, a network-level garbage collection schedule, such as the schedule generated during execution of the example routine 600 depicted in FIG. 6, may be obtained. The garbage collection schedule may illustratively include information regarding open and filled timeslots for scheduling garbage collection processes. At block 810, a candidate virtual machine instance may be selected from a pool of virtual machine instances that could potentially execute the task. In some embodiments, the pool of virtual machine instances may be determined based on criteria in the request to execute the task. For example, the task may require that a particular software library or runtime be installed in the virtual machine instance, and the pool of virtual machine instances that meet the requirement may be identified.

At block 812, a time may be estimated at which the selected virtual machine instance, if it executed the user-submitted task, would need to execute a garbage collection process. Illustratively, the time may be estimated based on the amount of garbage that the user task is predicted to generate during execution, along with characteristics of the virtual machine instance such at the amount of garbage already accumulated. In some embodiments, the time estimate may identify a specific time. In other embodiments, the time estimate may include a range of times at which garbage collection may need to occur.

At decision block 814, a determination may be made as to whether there is an open timeslot on the garbage collection schedule at the time estimated in block 812. In some embodiments, the determination may be as to whether a quantity or percentage of open timeslots at the estimated time (or the range of estimated times) satisfies a criterion. If the determination is that an open timeslot is not available at the estimated time, then the routine 800 returns to block 810, selects a different candidate virtual machine instance, and iterates until a virtual machine instance is found for which assigning the user task to the instance does not result in a forecasted shortage of timeslots at a particular time. Once a suitable virtual machine instance is found, the routine 800 branches to block 816, where the task may be assigned to the virtual machine instance.

In some embodiments, as described in more detail above, the estimate at block 812 may be that executing the user-submitted task on the candidate virtual machine instance would not cause a need to perform garbage collection within a specified timeframe (e.g., within the next 15 seconds). The determination at decision block 814 may thus be that the candidate virtual machine instance has sufficient capacity to execute the user-submitted task without causing a short-term need to execute a garbage collection process. In other embodiments, the routine 800 may pair tasks that generate a high amount of garbage with instances that have accumulated a low amount of garbage, or vice versa, or may assign tasks to instances in a manner that distributes requests to perform garbage collection processes across various timeframes in accordance with the garbage collection schedule.

It will be understood that FIG. 8 is provided for purposes of example, and that many variations on the illustrated routine 800 are within the scope of the present disclosure. For example, block 804 may be carried out after block 808, or block 808 may be carried out prior to execution of the routine 800. As a further example, the routine 800 may iterate through a fixed number of virtual machine instances before selecting a candidate, or may analyze instances for a fixed period of time before making an assignment. FIG. 8 is thus understood to be illustrative and not limiting.

Figure 9:
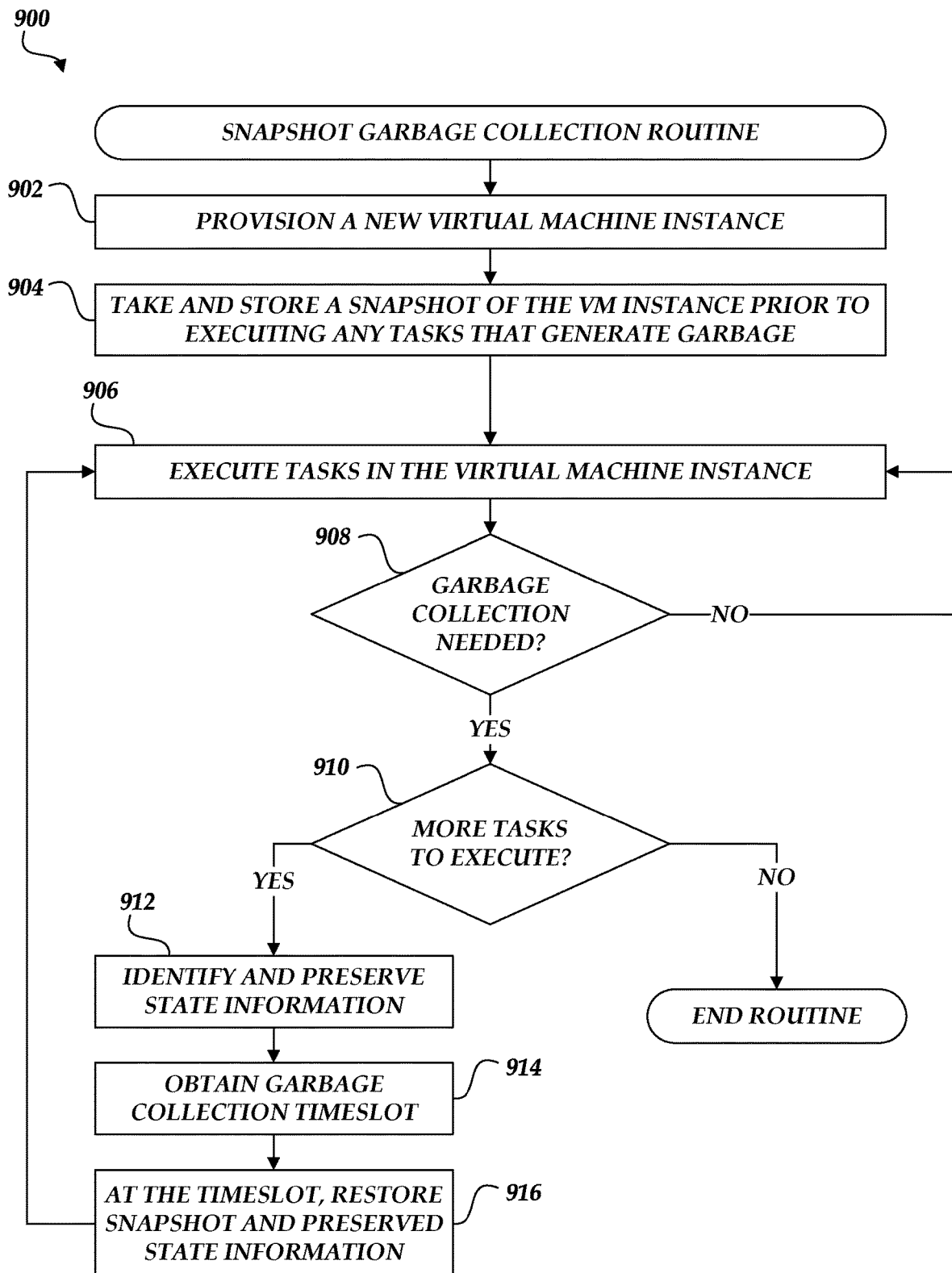
FIG. 9 is a flow chart depicting an illustrative routine for using snapshots to perform garbage collection processes in the on-demand code execution system of FIGS. 1A-1B.

FIG. 9 is a flow diagram of an illustrative routine 900 for using snapshots to perform garbage collection processes in accordance with aspects of the present disclosure. The routine 900 may be carried out, for example, by the garbage collection managers 164A-B depicted in FIG. 1B. The routine 900 begins at block 902, where a new virtual machine instance may be provisioned. In some embodiments, as described in more detail above, block 902 may be omitted and an existing virtual machine instance may be obtained. In other embodiments, the virtual machine instance may be provisioned and configured to execute user-submitted tasks, but may not have executed any tasks yet and thus no garbage has been accumulated. At block 904, a snapshot of the virtual machine instance may be taken and stored in a data store, such as the snapshot data store 168A depicted in FIG. 1B. In various embodiments, the snapshot may include information such as page table entries, contents of virtualized memory, contents of virtualized processor registers, or other information that enables restoring the virtual machine instance to a "pre-garbage" state.

At block 906, one or more tasks that generate garbage may be executed on the virtual machine instance. In some embodiments, a threshold may be reached (e.g., a number of tasks executed or a threshold amount of memory allocated) before proceeding to decision block 908.

At decision block 908, a determination may be made as to whether the virtual machine instance needs to execute a garbage collection process. The determination may be made similarly to determinations described above, such as the determination made at block 702 of example routine 700. If the determination is that the virtual machine instance does not yet need to perform a garbage collection process, then the routine 900 returns to block 906 and further user-submitted tasks may be executed in the virtual machine instance.

If and when the determination at decision block 908 is that a garbage collection process needs to be executed, then at decision block 910, in some embodiments, a determination may be made as to whether the virtual machine instance may be de-provisioned before it runs out of a computing resource. Illustratively, a virtual machine instance may be a candidate for de-provisioning if there are no further tasks to be executed in the instance. For example, a large instance (e.g., one provisioned with large amounts of a computing resource, such as memory) may be provisioned to execute a particular task, and then a determination may be made that it would be a better use of resources to de-provision the large instance and release the resources allocated to it. The determination at decision block 910 may thus be that garbage collection will not be necessary, since the virtual machine instance is going away soon and will not run out of the computing resource before it goes away. If the determination at decision block 910 is to allow the computing resources of the virtual machine instance to "fill up" with garbage before the instance is de-provisioned, then the routine 900 ends without taking further action.

If the determination at decision block 910 is instead that the virtual machine instance will remain in use, and thus that garbage will need to be collected, then at block 912, in some embodiments, any state information that should be preserved may be identified and retained. Illustratively, the virtual machine instance may open network connections, create objects, collect data, or otherwise generate state information that would be useful to the execution of further user-submitted tasks. For example, the user may submit a series of tasks that make use of a network connection, and the performance of the system when executing these tasks may be improved if the connection is left open between tasks. In some embodiments, as described above, state information may be preserved by making or retaining a copy, and then rewriting the state information at the appropriate time after restoring a snapshot of the virtual machine instance. In other embodiments, state information may be preserved in place by identifying and not restoring portions of the snapshot that would overwrite the desired state information.

At block 914, in some embodiments, a garbage collection timeslot may be obtained from a garbage collection schedule, such as the network-level garbage collection schedule generated by the example routine 600 depicted in FIG. 6. In other embodiments, snapshots may be used to perform garbage collection processes independently of a garbage collection schedule. At block 916, the snapshot and any preserved state information may be restored during the obtained timeslot.

It will be understood that FIG. 9 is provided for purposes of example, and that many variations on the illustrated routine 900 are within the scope of the present disclosure. For example, a snapshot of the virtual machine instance may be taken after tasks have been executed in the virtual machine instance, and a determination may be made as to whether and when to take a snapshot based on factors such as the resource costs associated with snapshots and conventional garbage collection routines. As a further example, the preservation of state information may be omitted and the snapshot may restore the virtual machine instance to the state it was in prior to executing user-submitted tasks. FIG. 9 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing garbage collection on a virtual machine instance, the system comprising:
    a processor in communication with a non-transitory data store; and
    computer-executable instructions stored in the non-transitory data store, wherein the computer-executable instructions, when executed by the processor, configure the processor to perform operations including:
        provisioning a virtual machine instance on a host computing device, wherein provisioning the virtual machine instance on the host computing device includes provisioning a virtualized processor and virtualized memory by allocating a portion of computing resources of the host computing device;
        configuring the virtual machine instance to execute one or more tasks that are submitted to an on-demand code execution system, the one or more tasks each comprising user-submitted code executable by the virtual machine instance;
        generating a snapshot of the virtual machine instance prior to executing any user-submitted code within the virtual machine instance, the snapshot including information regarding a state of the virtual machine instance;
        causing the virtual machine instance to execute the one or more tasks, wherein executing the one or more tasks causes garbage to accumulate in the virtualized memory;
        determining that garbage collection should be performed on the virtual machine instance; and
        performing the garbage collection by restoring the virtual machine instance using the snapshot.

2. The system of claim 1, wherein the garbage comprises an object or data in the virtualized memory that was created by a task but is no longer accessed by the task.

3. The system of claim 1, wherein determining that garbage collection is needed comprises:
    determining a remaining amount of the virtualized memory that is available for execution of further tasks; and
    determining that the remaining amount of the virtualized memory satisfies a criterion.

4. The system of claim 3, wherein the criterion is determined based at least in part on one or more of: an estimated memory usage of a task, or a rate of change in the remaining amount of the virtualized memory.

5. The system of claim 1, wherein the snapshot includes one or more of: a page table associated with the virtualized memory, at least a portion of content of the virtualized memory, or one or more registers of the virtual processor.

6. A computer-implemented method comprising:
    configuring a virtual machine instance to execute user-submitted tasks that are submitted to an on-demand code execution system, the virtual machine instance comprising a virtualized processor and virtualized memory that are allocated from computing resources of a host computing device;

generating a snapshot of the virtual machine instance prior to executing one or more user-submitted tasks within the virtual machine instance;

causing the virtual machine instance to execute the one or more user-submitted tasks, wherein executing the one or more user-submitted tasks causes garbage to accumulate in the virtualized memory;

determining that garbage collection should be performed on the virtual machine instance; and performing garbage collection by restoring the snapshot.

7. The computer-implemented method of claim 6 further comprising provisioning the virtual machine instance.

8. The computer-implemented method of claim 6, wherein determining that garbage collection should be performed on the virtual machine instance is based at least in part on a workload forecast.

9. The computer-implemented method of claim 6 further comprising determining that garbage collection should be performed by generating and restoring the snapshot.

10. The computer-implemented method of claim 9, wherein determining that garbage collection should be performed by generating and restoring the snapshot is based at least in part on the one or more user-submitted tasks.

11. The computer-implemented method of claim 9, wherein determining that garbage collection should be performed by generating and restoring the snapshot is based at least in part on a resource cost associated with generating the snapshot, a resource cost associated with restoring the snapshot, or a resource cost associated with performing garbage collection by executing a garbage collection task.

12. The computer-implemented method of claim 6, wherein the virtual machine instance comprises a container, and wherein causing the virtual machine instance to execute the one or more user-submitted tasks comprises causing the virtual machine instance to execute the one or more user-submitted tasks within the container.

13. The computer-implemented method of claim 6 further comprising:

receiving, from the virtual machine instance, a request to preserve state information associated with executing the one or more user-submitted tasks; and restoring the state information after restoring the snapshot.

14. The computer-implemented method of claim 13, wherein the state information comprises information regarding one or more of a network connection, an object in the virtualized memory, or data in the virtualized memory.

15. The computer-implemented method of claim 13, wherein the state information comprises an object or data on a kernel space page of the virtualized memory.

16. The computer-implemented method of claim 6, wherein the snapshot comprises page table entries associated with user space pages in the virtualized memory.

17. A non-transitory computer-readable medium including computer-executable instructions that, when executed by a processor, cause the processor to perform operations including:

configuring a virtual machine instance to execute user-submitted tasks that are submitted to an on-demand code execution system;

generating a snapshot of the virtual machine instance prior to executing one or more user-submitted tasks within the virtual machine instance;

causing the virtual machine instance to execute the one or more user-submitted tasks, wherein executing the one or more user-submitted tasks includes allocating one or more virtual computing resources, and wherein executing the one or more user-submitted tasks causes at least a portion of the one or more virtual computing resources to be allocated but no longer accessed by the one or more user-submitted tasks; and deallocating the at least a portion of the one or more virtual computing resources by restoring the snapshot.

18. The non-transitory computer-readable medium of claim 17, wherein the snapshot comprises allocation data from a time prior to allocation of the at least a portion of the one or more virtual computing resources.

19. The non-transitory computer-readable medium of claim 17, wherein configuring the virtual machine instance to execute user-submitted tasks comprises configuring one or more of an operating system, software library, network connection, or computing resource.

20. The non-transitory computer-readable medium of claim 17 including further computer-executable instructions that, when executed by the processor, cause the processor to perform operations including:

determining that an available portion of the one or more virtual computing resources satisfies a threshold.

\* \* \* \* \*